US006632548B2

(12) United States Patent
Saito et al.

(10) Patent No.: US 6,632,548 B2
(45) Date of Patent: Oct. 14, 2003

(54) MAGNETIC DISK COMPRISING A MAGNETIC LAYER HAVING SPECIFIC PROJECTIONS DISTRIBUTIONS

(75) Inventors: Shinji Saito, Kanagawa (JP); Takeshi Kakuto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 61 days.

(21) Appl. No.: 09/897,492

(22) Filed: Jul. 3, 2001

(65) Prior Publication Data

US 2002/0018918 A1 Feb. 14, 2002

(30) Foreign Application Priority Data

Jul. 3, 2000 (JP) ..................................... P. 2000-200795

(51) Int. Cl.[7] ................................................ G11B 5/703
(52) U.S. Cl. ............................. 428/694 B; 428/694 BN
(58) Field of Search ....................... 428/694 B, 694 BN

(56) References Cited

U.S. PATENT DOCUMENTS

| 5,601,916 A | * | 2/1997 | Yamazaki et al. ........... 428/329 |
| 5,718,964 A | | 2/1998 | Naoe et al. |
| 6,017,605 A | | 1/2000 | Yamazaki et al. |
| 6,074,724 A | | 6/2000 | Inaba et al. |
| 6,149,989 A | * | 11/2000 | Araki et al. ........... 427/694 BL |
| 6,475,598 B1 | * | 11/2002 | Naoe et al. .................. 428/141 |
| 6,479,131 B1 | * | 11/2002 | Ejiri et al. .................. 428/141 |
| 6,482,506 B1 | * | 11/2002 | Ejiri et al. .................. 428/212 |

FOREIGN PATENT DOCUMENTS

| JP | 9-115130 | 5/1997 |
| JP | 10-21522 | 1/1998 |
| JP | 10-302244 | 11/1998 |
| JP | 2000-57555 | 2/2000 |

OTHER PUBLICATIONS

European Search Report dated Oct. 4, 2001.

* cited by examiner

Primary Examiner—H. Thi Le
(74) Attorney, Agent, or Firm—Sughrue Mion, PLLC

(57) ABSTRACT

A magnetic disk for high-density recording is provided, wherein a substantially non-magnetic lower layer is formed on a support and a magnetic layer containing ferromagnetic powder dispersed in a binder is formed on the lower layer. The magnetic layer has a thickness of 0.02 to 0.5 $\mu$m, and on the surface thereof at least $1 \times 10^4$ projections standing at least 20 nm high and at most $1 \times 10^3$ projections standing at least 70 nm high per mm$^2$ measured by an atomic force microscope.

14 Claims, No Drawings

MAGNETIC DISK COMPRISING A MAGNETIC LAYER HAVING SPECIFIC PROJECTIONS DISTRIBUTIONS

FIELD OF THE INVENTION

The present invention relates to a magnetic particulate disk capable of high density-recording, which has a magnetic layer where a ferromagnetic powder is dispersed an a binder. More specifically, the invention is concerned with a magnetic disk for high-density recording, which has a substantially non-magnetic lower layer and a magnetic layer containing a ferromagnetic metal powder or a hexagonal ferrite powder.

BACKGROUND OF THE INVENTION

In the field of magnetic disks, 2 MB of MF-2HD floppy disks utilizing cobalt-modified iron oxide have become standard with personal computers. In these days of upsurge in data volume to be processed, however, it can no longer be said that such a capacity is sufficient, but it is desirable to further enlarge the capacities of floppy disks.

Magnetic recording media comprising a non-magnetic support coated with a magnetic layer containing iron oxide, cobalt-modified iron oxide, $CrO_2$, a ferromagnetic metal powder or a hexagonal ferrite powder dispersed in a binder have so far been used widely. Of these magnetic substances, the ferromagnetic metal powder and hexagonal ferrite powder are known to have excellent high-density recording characteristics.

In the case of disk-shaped magnetic recording media, the available large-capacity disks utilizing ferromagnetic metal powders excellent in high-density recording characteristics are 10 MB of MF-2TD and 21 MB of MF-2SD, and those utilizing hexagonal ferrite powders are 4MB of MF-2ED and 21MB of Fl optical. However, it can be said that the capacities and performances of these disks are no longer sufficient. Under these circumstances, many attempts to improve high-density recording characteristics have been made. Examples thereof are described below.

For improving characteristics of disk-shaped magnetic recording media, JP-A-64-84418 (the term "JP-A" as used herein means an "unexamined published Japanese patent application") proposes using vinyl chloride resin having acidic groups, epoxy groups and hydroxyl groups, JP-B-3-12374 (the term "JP-B" as used herein means an "examined Japanese patent publication") proposes using a metal powder having Hc of at least 79.6 kA/m (1,000 oersted (Oe)) and a specific surface area of 25 to 70 $m^2/g$, and JP-B-6-28106 proposes specifying the specific surface area and the magnetization intensity of a magnetic powder and further incorporating abrasives.

For improving durability of disk-shaped magnetic recording media, JP-B-7-85304 proposes using an unsaturated fatty acid ester and an ether linkage-containing fatty acid ester, JP-B-7-70045 proposes using a branched fatty acid ester and an ether linkage-containing fatty acid ester, JP-A-54-124716 proposes incorporating non-magnetic powder having a Mohs hardness of at least 6 and a high fatty acid ester, JP-B-7-89407 discloses controlling the volume of pores containing a lubricant to the specified range and the surface roughness to the range of 0.005 to 0.025 μm, JP-A-61-294637 discloses using fatty acid esters having low and high melting points, JP-B-7-36216 discloses using an abrasive having a grain size equal to from one-fourth to three-fourth the magnetic layer thickness and a fatty acid ester having a low melting point, and JP-A-3-203018 discloses using a ferromagnetic iron-aluminum alloy powder and particulate chromium oxide.

As to the structure of disk-shaped magnetic recording media having a non-magnetic lower or intermediate layer, JP-A-3-120613 proposes the structure comprising a conductive layer and a magnetic layer containing a metal powder, JP-A-6-290446 proposes the structure comprising a magnetic layer having a thickness of 1 μm or below and a non-magnetic layer, JP-A-62-159337 proposes the structure comprising a carbon interlayer and a magnetic layer containing a lubricant, and JP-A-5-290358 proposes the structure having a non-magnetic layer in which carbon particles having the limited size are incorporated.

Recently, on the other hand, disk-shaped magnetic recording media comprising a thin magnetic layer and a functional non-magnetic layer have been developed, and 100 MB class floppy disks have made their debut. As to magnetic disks having these characteristics, JP-A-5-109061 proposes the magnetic disk comprising a magnetic layer having Hc of at least 111.4 kA/m (1,400 Oe) and a thickness of at most 0.5 μm and a non-magnetic layer containing conductive particles, JP-A-5-197946 proposes the magnetic disk containing abrasives having a size greater than the magnetic layer thickness, JP-A-5-290354 proposes the magnetic disk wherein a magnetic layer has a thickness of at most 0.5 μm, variation in the magnetic layer thickness is controlled within ±15% and the surface electric resistance is adjusted to the specified range, and JP-A-6-68453 proposes the magnetic disk wherein two types of abrasives differing in grain size are incorporated and the their quantity at the surface is controlled to the specified range.

JP-A-6-52541 discloses the magnetic recording media containing as an abrasive at least one powder chosen from alumina, chromium oxide or diamond powder, and reports that the addition of such a highly hard powder has improved running stability.

For the purpose of preventing a drop in reproduction power caused by thickness loss of a magnetic layer, it is known to make the magnetic layer thin. For instance, JP-A-5-182178 discloses the magnetic recording media comprising a non-magnetic support, a non-magnetic lower layer containing an inorganic powder dispersed in a binder, and an upper magnetic layer having a thickness of at most 1.0 μm and containing a ferromagnetic powder dispersed in a binder, which is formed while the non-magnetic lower layer is in a wet state.

With even the aforementioned arts, however, it has become difficult to obtain satisfactory characteristics with the rapid increases in magnetic disk capacity and recording density. In the case of performing high-density recording on a magnetic disk in particular, minute destruction occurs in the magnetic layer by movements of the magnetic disk over a head, and makes it impossible to read data, thereby causing errors. On the other hand, when the magnetic disk surface is smoothened and the spacing between the head and the magnetic disk is made small with the intention of increasing the recording density, a friction increases between the head and the magnetic disk and as a result, the magnetic layer is further liable to be destroyed. Therefore, it has been desired to develop means to overcome those problems.

SUMMARY OF THE INVENTION

An object of the invention is to provide a magnetic disk for high-density recording which has greatly improved electromagnetic characteristics, especially high-density recording characteristics and which is prevented from the data loss caused by destruction of a magnetic layer resulting from head movement.

As a result of our intensive studies to produce a magnetic disk having excellent electromagnetic characteristics and satisfactory durability, it has been found that the foregoing object can be achieved by the magnetic disk described below.

More specifically, the present invention provides the following magnetic disks: 1. A magnetic disk comprising a support, a substantially non-magnetic lower layer formed on the support and a magnetic layer which is formed on the lower layer and contains a ferromagnetic powder dispersed in a binder, wherein the magnetic layer has a thickness of 0.02 to 0.5 μm and projections on the surface thereof, the number of the projections standing at least 20 nm high measured by an atomic force microscope is at least $1 \times 10^4$ per mm$^2$ and the number of the projections standing at least 70 nm high measured by an atomic force microscope is at most $1 \times 10^3$ per mm$^2$.

2. The magnetic disk as described in 1 above, wherein the number of the projections standing at least 20 nm high on the magnetic layer surface measured by an atomic force microscope is at least $1 \times 10^4$ per mm$^2$ and the number of the projections standing at least 70 nm high on the magnetic layer surface measured by an atomic force microscope is at most $2 \times 10^2$ per mm$^2$ by measurements with an atomic force microscope.

3. The magnetic disk as described in 1 or 2, wherein the number of projections standing at least 100 nm high on the magnetic layer surface measured by an optical profiler (light interference type surface roughness profilometer) is at most 0.01 per mm$^2$.

The expression "a substantially non-magnetic lower layer" used herein means that the layer is allowed to have magnetism to the extent of not affecting the recording result, and the layer is simply referred to as "a lower layer" or "a non-magnetic layer" hereinafter.

We have elucidated a mechanism of magnetic layer destruction arising from head movement over a magnetic disk having a thin magnetic layer formed on a lower layer, and found that the control of height and number of projections on the surface of magnetic layer can prevent the magnetic layer from destruction while retaining excellent high-density recording characteristics, thereby completing the invention.

The following is believed to be the reason why the present magnetic recording medium can escape the magnetic layer surface destruction by head movement and can have excellent durability.

As a result of our intensive study of the destruction phenomenon caused in a magnetic layer by head movement, the following two phenomena have been found to occur. First, projections on the magnetic layer are destructed by collision with the head, and these chips thus-formed pollute the surrounding normal magnetic layer surface to result in failure to read signals. Second, the movement of head on a level magnetic layer surface causes accumulation of minute shavings on the head, and thereby the magnetic layer itself sustains damage to result in failure to read signals. Further, it has been ascertained that the former phenomenon is liable to occur particularly when the projections stand at least 70 nm high and that the destruction was serious when the projections have a height of 100 nm or above. Therefore, it is believed that controlling the number of projections having the height to the specified value or below makes it possible to prevent defects on the magnetic layer surface based on the destruction of projections. On the other hand, the latter phenomenon can be restrained by providing on the magnetic layer surface such minute projections as not to suffer destruction by collision with a head. This is believed to be attributable to reduction in friction between the heat and the magnetic layer.

DETAILED DESCRIPTION OF THE INVENTION

The present magnetic disk is a magnetic disk having on the support a substantially non-magnetic lower layer and on the non-magnetic layer a magnetic layer containing a ferromagnetic powder dispersed in a binder.

The thickness of the magnetic layer is from 0.02 to 0.5 μm. And it can be found by measurement with an atomic force microscope (AFM) that the number of projections standing at least 20 nm high on the magnetic layer is at least $1 \times 10^4$ per mm$^2$ and the number of projections standing at least 70 nm high on the magnetic layer is at most $1 \times 10^3$ per mm$^2$.

By formulating the magnetic layer as mentioned above, it becomes possible to provide a magnetic disk having high levels of high-density characteristics and durability, which could not be obtained by the related arts, as well as greatly improved reliability in high-density recording areas.

More favorable results can be obtained when the number of the projections standing at least 70 nm high on the magnetic layer measured by an atomic force microscope is at most $2 \times 10^2$ per mm$^2$, and further the number of the projections standing at least 100 nm high on the magnetic layer surface measured by an optical profiler (light interference type surface roughness profilometer) is at most 0.01 per mm$^2$.

Methods for achieving the aforementioned distribution of projections on the magnetic disk surface of the invention, the invention is not particularly restricted, and the following methods can be adopted.

In adjusting minute projections to the specified number, it is effective to control projections on a support surface by properly choosing the particle size and amount of a filler incorporated in the support, although the impact of the projections on the support surface has on the magnetic disk surface varies depending on the composition and thickness of coating layers formed on the support. Further, the non-magnetic lower layer has a great effect on the surface form of the magnetic layer, and minute projections can be formed on the magnetic layer surface by controlling the particle size and shape of non-magnetic powder. As to the magnetic layer, minute projections can be formed whereon by controlling the particle size of non-magnetic powder, such as carbon black, abrasives or other solid powders.

In order to control the number of coarse projections to the specified range, it is appropriate to form no coarse projections, particularly projections having heights of 0.3 μm or above, on the support surface, because such coarse projections tend to generate projections standing at least 100 nm high on the magnetic layer surface. As to the non-magnetic lower layer and the magnetic layer, it is appropriate that the non-magnetic powders incorporated in those layers have small particle sizes and those having a narrow particle size distribution and including a small amount of coarse particles.

In preparing dispersions for forming the non-magnetic lower layer and magnetic layer, it is required to perform thorough dispersion so as not to leave undispersed matter, which becomes a cause of the formation of coarse projections. In addition, it is effective to carry out surface treatment of the magnetic layer with an abrasive tape to scrape coarse projections off the magnetic layer surface.

In the present magnetic disk, a lower layer and a thin magnetic layer (which is also referred to as "an upper layer" or "an upper magnetic layer" hereinafter) may be provided on one side or both sides of a support. As to the forming process of upper and lower layers, the lower layer is coated first, and the upper magnetic layer is coated while the lower layer is in a wet state (W/W) of after the lower layer is dried (W/D). From the viewpoint of production efficiency, the simultaneous or successive wet coating is preferred. In the case of disk, however, coating after drying is also usable enough.

In the simultaneous or successive wet coating (W/W) for the double-layer structure of the invention, the upper layer and the lower layer can be formed at the same time. Thus, a surface treatment process such as calendering can be effectively conducted and whereby surface roughness can be improved even in a very thin magnetic layer.

The composition of each constituent layer of the magnetic disk of the present invention is described in detail below.

Magnetic Layer

The magnetic layer of the present magnetic disk has a coercive force (Hc) of preferably at least 143 kA/m (1,800 oersted), more preferably at least 159 kA/m (2,000 oersted), and still more preferably 183 to 278 kA/m (2,300 to 3,500 oersted). When the coercive force is smaller than 143 kA/m (1,800 oersted) it is difficult to obtain high recording density.

The suitable center-plane average surface roughness (Ra) of the present magnetic layer is from 0.5 to 5 nm, determined by a 3D-Mirau method. When the Ra value is increased beyond 5 nm, losses due to the spacing between a head and the magnetic disk become great to cause a decrease in output and an increase in noise. As a result, the medium performance of the present magnetic disk cannot come into play. On the other hand, Ra values smaller than 0.5 nm are undesirable because the magnetic layer is liable to be damaged by a magnetic head.

Ferromagnetic Powder

The ferromagnetic powders suitable for the upper magnetic layer of the invention are ferromagnetic metal powders and hexagonal ferrite powders.

As the ferromagnetic metal powders, ferromagnetic alloy powders containing α-Fe as the main component are preferably employed.

Besides containing the atom specified above, these ferromagnetic powders may contain one or more atoms, for example, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B atoms. In particular, it is preferred to use a ferromagnetic metal powder containing, in addition to α-Fe, at least one atom selected from the group consisting of Al, Si, Ca, Y, Ba, La, Nd, Sm, Co, Ni and B, and more preferably at least one atom selected from the group consisting of Co, Y, Al, Nd and Sm.

The content of Co is preferably from 0 to 40 atomic %, more preferably from 15 to 35 atomic %, and still more preferably from 20 to 35 atomic %, based on the Fe.

The content of Y is preferably from 1.5 to 12 atomic %, more preferably from 3 to 10 atomic %, and still more preferably from 4 to 9 atomic %, based on the Fe.

The content of Al is preferably from 1.5 to 30 atomic %, more preferably from 5 to 20 atomic %, and still more preferably from 8 to 15 atomic %, based on the Fe.

Prior to dispersion, the ferromagnetic metal powders may be treated with a dispersing agent, a lubricant, a surfactant and/or an anti-static agent as described below. These treatments are specifically described, for example, in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-A-39-10307, JP-B-46-39639, and U.S. Pat. Nos. 3,026,215, 3,031,341, 3,100,194, 3,242,005 and 3,389,014.

The ferromagnetic metal powders may contain a small amount of hydroxides or oxides.

The ferromagnetic metal powders usable in the invention are those obtained by known manufacturing methods. The following are manufacturing methods, which the invention can adopt:

1) a method of reducing a composite organic acid salt (mainly an oxalate) with a reducing gas such as hydrogen,
2) a method of reducing iron oxide with a reducing gas such as hydrogen to produce particulate Fe or Fe—Co,
3) a method of thermally decomposing a metal carbonyl compound.
4) a method of adding a reducing agent such as sodium borohydride, a hypophosphite or hydrazine to an aqueous solution of ferromagnetic metal ion to reduce the ion, and
5) a method of evaporating a metal in an inert gas atmosphere of low pressure, thereby pulverizing the metal.

The ferromagnetic metal powders produced by the methods as described above may be subjected to any of slow oxidation treatments, including a method of drying the powders after immersion in an organic solvent, a method of immersing the powders in an organic solvent and thereinto blowing an oxygen-containing gas to form an oxide layer on the particle surface and then drying the particles, and a method of forming an oxide layer on the particle surface by controlling pressure shares of oxygen gas and inert gas without using any organic solvent.

As to the specific surface area ($S_{BET}$) measured by BET method, the ferromagnetic powder contained in the present magnetic layer ordinarily has the $S_{BET}$ value in the range of 45 to 80 m$^2$/g, preferably in the range of 50 to 70 m$^2$/g. It is undesirable for the ferromagnetic powder to have its $S_{BET}$ value outside the foregoing range, because $S_{BET}$ values smaller than 45 m$^2$/g cause noise increase and those greater than 80 m$^2$/g make it difficult to attain satisfactory surface properties.

The crystallite size of the ferromagnetic metal powder is ordinarily from 80 to 180 angstroms, preferably from 100 to 180 angstroms, and more preferably from 110 to 175 angstroms.

The average major axis length of the ferromagnetic powder is preferably from 30 to 150 nm, more preferably from 30 to 100 nm.

The acicular ratio of the ferromagnetic powder is preferably from 3 to 15, more preferably from 5 to 12.

The saturation magnetization ($\sigma s$) of the ferromagnetic powder is ordinarily from 100 to 200 A·m$^2$/kg (emu/g), preferably from 120 to 180 A·m$^2$/kg (emu/g).

It is preferred that the ferromagnetic powder has a water content of 0.01 to 2.0 weight %. The water content in the ferromagnetic metal powder is preferably optimized depending on the kind of the binder used together. Further, it is preferred that the pH of the ferromagnetic powder is optimized depending on the combination with the binder used. The optimal pH range is ordinarily from 4 to 12, preferably from 6 to 10.

The ferromagnetic powder may be subjected to surface treatment with Al, Si, P or an oxide of such an element, if desired. The proportion of such an element or its oxide to the ferromagnetic powder used for the surface treatment is ordinarily from 0.1 to 10 weight %. This surface treatment can produce a desirable effect that adsorption of a lubricant such as fatty acid can be controlled to 100 mg/m$^2$ or below.

The ferromagnetic powder used contains an inorganic ion such as Na, Ca, Fe, Na or Sr ion. Although it is preferable that the ferromagnetic powder is substantially free of such ions, they have little effect on characteristics of the magnetic layer so far as their content is 200 ppm or below.

Further, it is preferred that the ferromagnetic powder used has fewer pores. The suitable proportion of pores is preferably 20 volume % or below, more preferably 5 volume % or below. In addition, the ferromagnetic powder used in the invention may have any of acicular, rice-grain and spindle shapes as far as it meets the foregoing particle size requirements.

It is preferred that the ferromagnetic powder itself has smaller SFD (switching field distribution). The value of SFD is preferably 0.8 or below. In other words, it is preferable that the Hc distribution of ferromagnetic powder is narrow. The SFD values below 0.8 are suitable for high-density digital magnetic recording, because they can ensure satisfactory electromagnetic characteristics, high output, sharp magnetization reversal and reduced peak shift. In the case of ferromagnetic metal powders, such a narrow Hc distribution can be attained by rendering the particle size distribution of geothite narrow or preventing geothite from sintering.

Abrasives

In the magnetic layer of the present magnetic disk, known abrasives can be used. In particular, diamond and alumina particles are preferably used.

Diamond and Alumina Particles

In the case of diamond, artificial diamond is generally used, because natural diamond is expensive. Examples of a production method of diamond include the so-called static synthesis method, wherein diamond is produced from graphite through Fe, Co or Ni under high temperature and high pressure or it is produced by causing reaction of graphite or furan resin carbons under high temperature and high pressure, dynamic synthesis methods and vapor-phase synthesis methods. Any of those methods may be adopted for the production of diamond for use in the invention.

The average size of diamond particles is preferably from 0.05 to 1 μm, more preferably from 0.07 to 0.5 μm. The suitable proportion of diamond mixed in the magnetic layer is from 0.1 to 5 weight %, preferably from 0.5 to 3 weight %, to the ferromagnetic powder.

The diamond which has been used industrially for cutting or abrasive purpose and undergone removal of impurities by discrimination washing may be utilized secondarily. Classification of diamond particles can be effected by applying centrifugal force to a diamond dispersion or utilizing a special mesh filter.

As the alumina particles, aluminum oxide having an α-alumina content of at least 90% and β-alumina can be employed. The suitable average size of alumina particles is from 0.01 to 1 μm, preferably from 0.05 to 0.5 μm. The proportion of alumina particles mixed in the magnetic layer is preferably from 0.1 to 20 weight %, more preferably from 0.5 to 3 weight %, to the ferromagnetic powder.

Other Abrasives

In the magnetic layer of the present magnetic disk, abrasives other than those described above maybe used together therewith, if desired. As such abrasives, known materials having Mohs hardness of at least 6, such as silicon carbide, chromium oxide, cerium oxide, α-iron oxide, corundum, silicon nitride, titanium carbide, titanium oxide, silicon dioxide and boron nitride, can be used alone or as combinations. Further, these abrasives may be used in the form of complex (obtained by treating the surface of one abrasive with another abrasive). Although those abrasives sometimes contain compounds or elements other than their main components, they can function as abrasives as far as the proportion of their respective main components is greater than 90 weight %. The average particle size of those abrasives used together is ordinarily from about 0.01 to 2 μm. In order to enhance electromagnetic characteristics in particular, it is advantageous that those abrasives have narrow particle size distributions. For elevation of durability, on the other hand, abrasives having different particle sizes can be used in combination as required, or abrasives can be used individually as far as their particle size distributions are broad.

It is advantageous that the abrasives used in the magnetic layer, inclusive of diamond and alumina fine particles, have their tap density in the range of 0.3 to 2 g/cc, their water content in the range of 0.1 to 5 weight %, their pH in the range of 2 to 11 and their specific surface area in the range of 1 to 30 m$^2$/g.

The abrasives may have any of acicular, spherical and cubic shapes. However, shapes sharpened in parts are advantageous from the viewpoint of abrasive capability.

Examples of commercially available abrasives include AKP-12, AKP-15, AKP-20, AKP-30, AKP-50, HIT-20, HIT-30, HIT-55, HIT-60, HIT-70, HIT-80 and HIT-100, which are products of Sumitomo Chemical Co., Ltd.; ERC-DBM, HP-DBM and HPS-DBM, which are products of Reynolds Metals Company; WA10000, a product of Fujimi Corporation; UB20, a product of Uemura Kogyo & Co., Ltd.; G-5, Chromex U2 and Chromex U1, products of Nippon Chemical Industrial Co., Ltd.; TF100 and TF140, products of Toda Kogyo Corp.; Beta Random Ultrafine, a product of Ibiden Co, Ltd.; and B-3, a product of Showa Mining Co., Ltd.

These abrasives can be also added to the lower layer, if desired. By adding abrasives to the lower layer, the surface profiling can be controlled, or protuberances of abrasives from the surface can be controlled. Needless to say, optimum values are selected for the sizes and the amounts of abrasive particles used in the magnetic layer and added to the lower layer.

As carbon black mixed in the magnetic layer, furnace black for rubber use, thermal black for rubber use, carbon black for color and acetylene black are used.

It is preferred that the carbon black used in the magnetic layer have its specific surface area in the range of 5 to 500 m$^2$/g, its DBP absorptive capacity in the range of 10 to 400 ml/100 g, its average particle size in the range of 5 to 300 nm, its pH in the range of 2 to 10, its water content in the range of 0.1 to 10 weight % and its tap density in the range of 0.1 to 1 g/cc.

Examples of commercially available carbon black include BLACKPEARLS-130 produced by Cabot Corp., #55, #50, and #35 produced by Asahi Carbon Co., Ltd., N660 produced by Mitsubishi Chemical Corp., and RAVEN 410, 420, 500 and 22 produced by Columbian Chemicals Co.

In advance of its use, carbon black may be surface-treated with a dispersing agent, a resin may be grafted on carbon black, or carbon black surface may be partly converted into graphite. On the other hand, carbon black may be dispersed in a binder before it is added to a magnetic coating composition. The carbon black can be used alone or in combination of two or more thereof.

When carbon black is mixed in the magnetic layer, the preferred proportion of carbon black to a ferromagnetic powder is from 0.1 to 30 weight %. The carbon black mixed in the magnetic layer has functions of preventing electrostatic charge, reducing a friction coefficient, light shielding and increasing the film strength. The function of the carbon black may be varied depending on the nature of the carbon black used. Therefore, the kinds, amounts and combinations of carbon black products may be different between the upper magnetic layer and the lower layer. Of course, it is possible to choose different carbon black products for the magnetic layer and the lower layer on the basis of the foregoing properties, such as the particle size, oil absorption, conductivity and pH, so to suite respective purposes of these layers. But actually, it is required in each layer to optimize the conditions under which carbon black is used. Details of various types of carbon black usable in the present magnetic layer can refer to, e.g., *Carbon Black Binran* (which may be translated by the English title "*Handbook of Carbon Black*"), compiled by Carbon Black Association.

Non-magnetic Layer (Lower Layer)

Now, the lower layer is described in detail below.

The lower layer of the present magnetic disk has no particular restrictions on its constitution so far as the layer exhibits no magnetism in a substantial sense. In general, however, the layer comprises at least a binder. And it is preferable to disperse powder, e.g., an inorganic or organic powder, into the binder.

Such an inorganic powder is generally non-magnetic, but it may also be magnetic so far as it is used to an extent that the lower layer is kept non-magnetic in a substantial sense. The expression "the lower layer is non-magnetic in a substantial sense" means that the lower layer is allowed to have magnetism to an extent of causing substantially no deterioration in electromagnetic characteristics of the upper layer. Specifically, such an extent of magnetism is comparable to the case where the lower layer has residual magnetic flux density of 0:01 tesla (100 gauss (G)) or below and coercive force of 7.94 kA/m (100 oerstead) or below.

Non-magnetic Powder

The non-magnetic powder can be selected from inorganic compounds, such as metal oxides, metal carbonates, metal sulfates, metal nitrides, metal carbides or metal sulfides. More specifically, aluminium oxide having an α-alumina content of at least 90%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide can be used alone or as combinations of two or more thereof. Of these inorganic compounds, titanium oxide, zinc oxide, iron oxide and barium sulfate are used to advantage because these compounds have narrow particle size distributions and many means to impart functions. In particular, it is effective to use titanium oxide and α-iron oxide.

It is preferred that those non magnetic powders have an average particle size of 0.005 to 2 μm. However, if desired, the average particle size may fall within such a range by the combined use of non-magnetic powders differing in particle size or independent use of a non-magnetic powder having a broad particle size distribution. In particular, non-magnetic powders having their average particle sizes in the range of 0.01 to 0.2 μm are preferable. When the non-magnetic powder is granular metal oxide, the preferable average diameter thereof is 0.08 μm or below; while, in the case of acicular metal oxide, the preferable average major axis length is 0.3 μm or below, more preferably 0.2 μm or below. The tap density of non-magnetic powder is ordinarily from 0.05 to 2 g/ml, preferably from 0.2 to 1.5 g/ml. The water content of non-magnetic powder is ordinarily in the range of 0.1 to 5 weight %, preferably 0.2 to 3 weight %, more preferably 0.3 to 1.5 weight %. The pH of non-magnetic powder is ordinarily in the range of 2 to 11, but the pH range of 3 to 10 is preferred in particular.

The specific surface area of non-magnetic powder is ordinarily in the range of 1 to 100 $m^2/g$, preferably 5 to 80 $m^2/g$, more preferably 10 to 70 $m^2/g$. The crystallite size of non-magnetic powder is preferably from 0.004 to 1 μm, more preferably 0.04 to 0.1 μm. The oil absorptive capacity using dibutyl phthalate (DBP) is ordinarily in the range of 5 to 100 ml/100 g, preferably 10 to 80 ml/100 g, more preferably 20 to 60 ml/100 g. The specific gravity is ordinarily from 1 to 12, preferably from 3 to 6. The shape of non-magnetic powder may be any of acicular, spherical, polyhedral and tabular shapes. The Mohs hardness of non-magnetic powder is preferably from 4 to 10. The amount of stearic acid (SA) adsorbed to non-magnetic powder is ordinarily in the range of 1 to 20 $\mu mol/m^2$, preferably 2 to 15 $\mu mol/m^2$, more preferably 3 to 8 $\mu mol/m^2$.

It is preferred that the non-magnetic powders as recited above undergo surface treatment for forming $Al_2O_3$, $SiO_2$, $TiO_2$, $ZrO_2$, $SnO_2$, $Sb_2O_3$, ZnO or $Y_2O_3$ on the powder surface. Of these oxides, $Al_2O_3$, $SiO_2$, $TiO_2$ and $ZrO_2$, especially $Al_2O_3$, $SiO_2$ and $ZrO_2$, are preferred from the viewpoint of dispersibility. Those oxides may be used in combination or independently.

Such a surface treatment layer may be formed by co-precipitation of the desired oxides, or by providing an alumina layer first and then silica layer, or vise versa. In addition, the surface treatment layer formed may be porous depending on the intended purposes, but it is ordinarily preferred that the layer be uniform and dense.

Examples of non-magnetic powder usable for the present lower layer include Nanotite produced by Showa Denko K.K., HIT 100 and ZA-G1 produced by Sumitomo Chemical Co., Ltd., α-hematite DPN-250, DPN-250BX, DPN-245, DPN-270BX, DPN-500BX, DBN-SA1 and DBN-SA3 produced by Toda Kogyo Corp., titanium oxide TTO-51B, TTO-55A, TTO-55B, TTO-55C, TTO-55S, TTO-55D and SN-100, α-hematite E270, E271, E300 and E303 produced by Tshihara Sangyo Co., Led., titanium oxide STT-4D, STT-30D, STT-30 and STT-65C, α-hematite α-40 produced by Titan Kogyo K.K., MT-100S, MT-100T, MT-150W, MT-500, MT-600B, MT-100F and MT-500HD produced by Tayca Corp., FINEX-25, BF-1, BF-10, BF-20 and ST-M produced by Sakai Chemical Industry Co., Ltd., DEFIC-Y and DEFIC-R produced by Dowa Mining Co., Ltd., AS2BM and TiO2P25 produced by Nippon Aerosil Co., Ltd., 100A and 500A produced by Ube Industries Ltd., and burned substances thereof. Of these non-magnetic powder, titanium dioxide and α-iron oxide products are preferred in particular.

Carbon Black Mixed in Lower Layer

By mixing carbon black in a lower layer, known effects can be imparted to the layer. For instance, the surface electric resistance (Rs) can be lowered, the light transmittance can be reduced, and the desired micro Vickers hardness can be attained. In addition, the carbon black contained in the lower layer can produce a lubricant storage effect. As to the kinds of carbon black capable of producing such effects, furnace black for rubber use, thermal black for rubber use, carbon black for color and acetylene black are usable. It is appropriate that the carbon black used for the lower layer be optimize as to the characteristics as mentioned below depending on the desired effects. In some cases, greater effects can be achieved by combined use of different kinds of carbon black.

The carbon black used in the lower layer ordinarily has its specific surface area in the range of 100 to 500 $m^2/g$, preferably 150 to 400 $m^2/g$, and its DBP absorptive capacity ordinarily in the range of 20 to 400 ml/100 g, preferably 30 to 400 ml/100 g. The average particle size of the carbon black used is ordinarily from 5 to 80 nm, preferably from 10 to 50 nm, and more preferably from 10 to 40 nm. Further, it is preferred that the pH, water content and tap density of the carbon black used be from 2 to 10, from 0.1 to 10 weight % and from 0.1 to 1 g/ml, respectively.

Examples of carbon black usable in the lower layer include BLACKPEARLS 2000, 1300, 1000, 900, 800, 880 and 700, and VULCAN XC-72 produced by Cabot Corp., #3050B, #3150B, #3250B, #3750B, #3950B, #950, #650B, #970B, #850B, MA-600, MA-230, #4000 and #4010 produced by Mitsubishi Chemical Corp., CONDUCTEX SC, RAVEN 8800, 8000, 7000, 5750, 5250, 3500, 2100, 2000, 1800, 1500, 1255 and 1250 produced by Columbian Chemicals Co., and Ketjenblack EC produced by Akzo Co., Ltd.

In advance of its use, carbon black may be surface-treated with a dispersing agent, a resin may be grafted on carbon black, or carbon black surface may be partly converted into graphite. On the other hand, carbon black ray be dispersed in a binder before it is added to a coating composition.

The carbon black can be used in a proportion lower than 50 weight % to the inorganic compound powder as recited above, and that lower than 40 weight % to the total weight of non-magnetic layer. The carbon black of various kinds as recited above may be used alone or as combinations. Details of various kinds of carbon black usable in the present invention can refer to, e.g., *Carbon Black Binran* (which may be translated by the English title *"Handbook of Carbon Black"*), compiled by Carbon Black Association.

To the lower layer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, polyester resin powder, polyamide resin powder, polyimide resin powder and polyfluoroethylene resin powder may be used. For production of those organic powders, the methods described in JP-A-62-18564 and JP-A-60-255827 can be adopted.

Binders

The binders used in the invention may be any of resins hitherto used as binders, including known thermoplastic resins, thermosetting resins, reactive resins and mixtures thereof.

As to the thermoplastic resins usable as binders, their glass transition temperatures are ordinarily within the range of −100 to 150° C., their number average molecular weights (determined by GPC method in terms of polystyrene) are ordinarily within the range of 1,000 to 200,000, preferably 10,000 to 100,000, and their polymerization degrees are ordinarily of the order of 50–1,000.

Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resin and various resins of rubber type.

And examples of thermosetting resins or reactive resins include phenol resin, epoxy resin, cure type polyurethane resin, urea resin, melamine resin, alkyd resin, acrylic reactive resin, formaldehyde resin, silicone resin, epoxypolyamide resin, a mixture of polyester resin and isocyanate prepolymer, a mixture of polyesterpolyol and polyisocyanate, and a mixture of polyurethane and polyisocyanate. Details of these resins are described, e.g., in *Plastics Handbook,* published by Asakura Shoten.

On the other hand, it is possible to use known electron beam-curable resins in each layer. Detailed explanation of such resins and manufacturing methods thereof can be found in JP-A-62-256219.

The resins as recited above can be used alone or as a combination of two or more thereof. As suitable examples of a resin combination, mention may be made of a combination of polyurethane resin and at least one resin selected from the groups consisting of vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of the foregoing combination and polyisocyanate.

As the polyurethane resin, those known including polyesterpolyurethane, polyetherpolyurethane, polyetherpolyesterpolyurethane, polycarbonatepolyurethane, polyesterpolycarbonatepolyurethane and polycaprolactone-polyurethane can be adopted.

For enhancing dispersibility and durability of all the binders recited above, it is preferred that at least one polar group selected from —COOM, —SO$_3$M, —OSO$_3$M, —P=O(OM)$_2$, —O—P=O(OM)$_2$ (wherein M is a hydrogen atom or an alkali metal), —OH, —NR$_2$, —N$^+$R$_3$ (wherein R is a hydrocarbon group), epoxy group, —SH or —CN is introduced into each binder by copolymerization or addition reaction on an as needed basis.

The suitable content of such polar groups in each binder is from $10^{-1}$ to $10^{-8}$ mole/g, preferably from $10^{-2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE produced by Union Carbide Co., MPR-TA, MPR-TA5, MPR-TAL, MPR-TSN, MPR-TMF, MPR-TS, MPR-TM and MPR-TAO produced by Nissin Chemical Industry Co., Ltd., 1000W, DX80, DX81, DX82, DX83 and 100FD produced by Denki Kagaku Kogyo K.K., MR-104, MR-105, MR110, MR100, M555 and 400X-110A produced by Nippon Zeon Co., Ltd., Nipporan N2301, N2302 and N2304 produced by Nippon Polyurethane Industry Co., Ltd., Pandex T-5105, T-R3080 and P-5201, Barnoc D-400 and D-210-

80, and Crysbon 6109 and 7209 produced by Dainippon Ink & Chemicals, Inc., Vylon UR8200, UR830, UR-8700, RV530 and RV280 produced by Toyobo Co.,Ltd. Daiferamine 4020, 5020, 5100, 5300, 9020, 9022 and 7020 produced by Dainichiseika C. & C Mfg. Co., Ltd., MX5004 produced by Mitsubishi Chemical Industries Ltd., Sanprene SP-150 produced by Sanyo Chemical Corp., and Saran F310 and F210 produced by Asahi Chemical Industry Co., Ltd.

In the present magnetic disk, such binders are used in a proportion of ordinarily 5 to 50 weight %, preferably 10 to 30 weight %, to the non-magnetic powder in the lower layer or the ferromagnetic powder in the magnetic layer.

More specifically, it is favorable to use as the binder vinyl chloride resin in a proportion of 5 to 30 weight %, polyurethane resin in a proportion of 2 to 20 weight % and polyisocyanate in proportion of 2 to 20 weight % in combination with those resins. However, it is possible to use polyurethane alone or a combination of polyurethane with polyisocyanate alone in the case where a slight amount of chlorine evolved by dechlorination causes head corrosion.

In the case of using polyurethane as a binder in the invention, it is preferred that the polyurethane have a glass transition temperature of −50 to 150° C., preferably 0 to 100° C., endure an elongation of 100 to 2,000% and a stress of 0.49 to 98 $N/mm^2$ (0.05 to 10 $kg/mm^2$) before it breaks, and have a yield point of 0.49 to 98 $N/mm^2$ (0.05 to 10 $Kg/mm^2$).

The magnetic disk is basically constructed of a lower layer and a magnetic layer, but the lower layer and/or the magnetic layer may have two or more constituent layers. Therefore, needless to say, it is possible to vary the binder content, the proportions of vinyl chloride resin, polyurethane resin, polyisocyanate and other resins in the binder, or the molecular weight and polar group content of each of resins forming the magnetic layer, or physical characteristics of the resins as mentioned above from one constituent layer to another, if desired. If anything, it is better to optimize those factors on a constituent layer basis. In this case, known arts of multilayer structure are applicable. In the case of varying the binder content from one constituent layer to another, for instance, increasing a binder content in the magnetic layer enables reduction of abrasion at the magnetic layer surface. Also, to increase the content of binder resin in a lower layer can render the lower layer flexible and improve the touch of a head on the magnetic disk. In applying known arts, it goes without saying that optimizations are performed within a range that the present effects can be achieved.

Examples of polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates.

Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), are Desmodur L, Desmodur IL, Desmodur N and Desmodur HL (trade names, produced by Sumitomo Bayer Co., Ltd.). In each layer, these products may be used alone or as a combination of at least two products utilizing a difference in curing reactivity.

Additives

Compounds having a lubricating effect, an anti-static effect, a dispersing effect or a plasticizing effect can be used as additives for the magnetic layer and the lower layer to constitute the present magnetic disk.

Examples of compounds usable as such additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkyl phosphoric acid ester and alkali metal salts thereof, alkylsulfuric acid ester and alkali metal salts thereof, polyphenyl ether, phenylphosphonic acid, α-natphthylphosphoric acid, phenylphosphoric acid, diphenylphosphoric acid, p-ethylbenzenephosphonic acid, phenylphosphinic acid, aminoquinone, various silane coupling agent, titanium coupling agent, fluorine-containing alkylsulfuric acid ester and alkali metal salts thereof, monobasic fatty acid containing 10 to 24 carbon atoms (which may contain unsaturated bonds or may be branched) and metal salts of such a fatty acid (e.g., Li, Na, Ka and Cu salts), monohydric to hexahydric alcohols each containing 12 to 22 carbon atoms (which may have unsaturated bonds or may be branched), alkoxyalcohol containing 12 to 22 carbon atoms (which may have unsaturated bonds or may be branched), mono-, di- or tri-fatty acid ester produced by reaction of 10–24C monobasic fatty acid (which may have unsaturated bonds or may be branched) with one kind of alcohol chosen from 2–12C monohydric to hexahydric alcohols (which may have unsaturated bonds or may be branched), fatty acid ester of polyalkylene oxide monoalkyl ether, fatty acid amide containing 8 to 22 carbon atoms, and aliphatic amine containing 8 to 22 carbon atoms.

More specifically, the foregoing fatty acid includes capric acid, caprylic acid, lauric acid, myristic acid, palmitic acid, stearic acid, behenic acid, oleic acid, elaidic acid, linoleic acid, linolenic acid, and isostearic acid.

The foregoing ester includes butyl stearate, octyl stearate, amyl stearate, isooctyl stearate, butyl myristate, octylmyristate, butoxyethyl stearate, butoxydiethyl stearate, 2-ethylhexyl stearate, 2-octyldodecyl palmitate, 2-hexyldodecyl palmitate, isohexadecyl stearate, oleyloleate, dodecyl stearate, tridecyl stearate, oleyl erucate, neopentyl glycol didecanoate, and ethylene glycol dioleyl ester.

The foregoing alcohol includes oleyl alcohol, stearyl alcohol, and lauryl alcohol.

Further, nonionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfato and phosphate groups, and amphoteric surfactants, such as amino acids, aminosulfonic acids, sulfuric or phosphoric acid esters of aminoalcohols, and alkyl betaine-type surfactants, can be used. Details of these surfactants are described in *Kaimen Kasseizai Binran* (which may be translated by the English title "*Handbook of Surfactants*"), published by Sangyo Tosho K.K. The lubricants and anti-static agents as recited above are not always required to be pure, but may contain impurities, such as isomers, unreacted materials, by-products, decomposed matter and oxides. The allowable level of contamination with such impurities is below 30 weight % preferably below 10 weight %.

Those lubricants and surfactants usable in the invention have different physical actions from each other. So it is required that the species and amounts of surfactants and lubricants to be used and the proportion between lubricants capable of producing a synergistic effect be determined optimally depending on the intended purpose. For instance, it is thought that the oozing of fatty acids and esters from the layer surface is controlled by using fatty acids differing in melting point or esters differing in boiling point, melting points and polarity in the lower layer and the magnetic layer respectively, the coating stability is enhanced by controlling the amount of surfactants added, and the lubricating effect is elevated by adding a greater amount of lubricant to the lower layer. Needless to say, the cases mentioned above should not be construed as limiting the scope of the invention. In general, the total proportion of lubricants can be chosen from the range of 0.1 to 50 weight %, preferably 2 to 25 weight %, to the ferromagnetic powder in the magnetic layer or the non-magnetic powder in the lower layer.

All or part of additives used in the invention may be added in any of processes for preparing the magnetic or non-magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. On the other hand, simultaneous or successive application of all or part of the additives to an already formed magnetic layer sometimes allows the desired purposes to be achieved. Further, in some cases, the magnetic layer surface may be coated with a lubricant after calendering (heating and pressing treatment with a calender roll) or slitting operation.

For preparing the coating compositions as mentioned above, known organic solvents are usable, with examples including the solvents described in JP-A-6-68453.

Layer Structure

The layer structure of the present magnetic disk is described below in detail.

The thickness of the support of the present magnetic disk is preferably from 10 to 100 $\mu$m, more preferably from 20 to 80 $\mu$m.

Between the support and the lower layer, an under-coat layer may be provided for the purpose of adhesion enhancement. The thickness of the under-coat layer is preferably from 0.01 to 0.5 $\mu$m, more preferably from 0.02 to 0.5 $\mu$m. The present magnetic disk may be a double-sided disk-shaped magnetic medium provided with the lower layer and the magnetic layer on each side of the support, or a single-sided disk-shaped magnetic medium provided with those layers on only one side of the support. In the latter case, a backing layer may be provided on the side opposite to the lower and magnetic layers for producing effects of preventing electrification and compensating for curl. The thickness of the backing layer is from 0.1 to 4 $\mu$m, preferably from 0.3 to 2.0 $\mu$m. To these under-coat layer and backing layer, known ones are applicable.

The magnetic layer thickness of the present magnetic disk is optimized depending on the saturation magnetization of a head used, the head gap length and the frequency band of recording signals. The thickness of the magnetic layer is preferably from 0.02 to 0.5 $\mu$m, more preferably from 0.03 to 0.25 $\mu$m. The present magnetic layer may be divided into two or more layers differing in magnetic characteristics, and can be made up according to known constitutions for magnetic layers having a multilayer structure.

The thickness of the lower layer is ordinarily from 0.2 to 5 $\mu$m, preferably from 0.3 to 3 $\mu$m, more preferably from 1 to 2.5 $\mu$m. The lower layer can achieve its effect as far as it is substantially non-magnetic. Even when the lower layer contains magnetic impurities or a slight amount of magnetic substance is added thereto intentionally, the effects intended by the invention can be produced. Therefore, as already mentioned, such a layer is regarded as having substantially the same composition as the present lower layer. Specifically, there is a case where an under layer having residual magnetic flux density of 0.01 tesla (100 gauss (G)) or below or coercive force of 7.94 kA/m (100 oerstead) or below. However, a layer having neither residual magnetic flux density nor coercive force is preferred.

Support

It is preferred that the support used for the present magnetic disk is non-magnetic. Examples of the non-magnetic support include known films made from polyesters, such as polyethylene terephthalate and polyethylene naphthalate, polyolefins, cellulose triacetate, polycarbonate, polyamides (including aliphatic polyamides and aromatic polyamides such as aramide), polyimides, polyamideimides, polysulfone and polybenzoxazole. Of these films, films having high strength, such as polyethylene naphthalate and polyamide films, are preferred as the support. If desired, the multilayer support as disclosed in JP-A-3-224127 can be used for causing a difference in surface roughness between the magnetic layer side and the base side of the support. Those support materials may undergo in advance corona discharge treatment, plasma treatment, adhesion-increasing treatment, heat treatment and dust cleaning treatment. In addition, it is possible to use an aluminum or glass substrate as the support.

In the present magnetic disk, it is advantageous to use as the support a support material having a center-plane average surface roughness (Ra) of at most 8.0 nm, preferably at most 4.0 nm, more preferably at most 2.0 nm, measured with an optical profiler (light interference type surface roughness profilometer) made by WYKO Co (e.g., Model TOPO-3D, made by WYKO Co.). It is more advantageous that the support has not only small center-plane average surface roughness but also no coarse projections standing at least 0.3 $\mu$m high. Minute projections can be controlled by properly choosing the size and amount of filler added to the support. Examples of the filler used include oxides or carbonates of Ca, Si and Ti and organic powders of acrylic resins.

As to the surface roughness characteristics of the support, it is preferred that the support have a maximum height SRmax of at most 1 $\mu$m, a ten-point average roughness SRz of at most 0.5 $\mu$m, a center-plane peak height SRp of at most 0.5 $\mu$m, a center-plane valley depth SRv of at most 0.5 $\mu$m, a center-plane area rate SSr of 10 to 90% and an average wavelength S$\lambda$a of 5 to 300 $\mu$m.

The F-5 value of the support used for the present magnetic disk is preferably from 49 to 490 N/mm$^2$ (5 to 50 kg/mm$^2$). The e thermal shrinkage ratio of the support is preferably 3%, or below, more preferably 1.5% or below, under heating at 100° C. for 30 minutes, while that is preferably 0.5% or below, more preferably 0.1% or below, under heating at 80° C. for 30 minutes Further, it is preferred that the support endure a stress of 49 to 980 N/mm$^2$ (5 to 100 kg/mm$^2$) before it breaks and have a elasticity coefficient of 980 to 19600 N/m$^2$ (100 to 2000 kg/mm$^2$). In addition, the temperature expansion coefficient thereof is from $10^{-4}$ to $10^{-8}/°$ C., preferably from $10^{-5}$ to $10^{-6}/°$ C., and the humidity expansion coefficient thereof is at most $10^{-4}/RH$ %, preferably at most $10^{-5}/RH$ %. Moreover, it is advantageous that these thermal characteristics, dimensional characteristics and mechanical strength characteristics be almost uniform in all in-plane directions with tolerances of 10%.

Method of Producing Magnetic Disk

The process of preparing the magnetic coating composition or the lower layer composition for the present magnetic disk comprises at least kneading and dispersing steps and, if desired, mixing steps may be added before and after those steps. Each step may be parted into two or more stages.

All materials, inclusive of a ferromagnetic powder, a non-magnetic powder, a binder, carbon black, an abrasive, an anti-static agent, a lubricant and a solvent, may be added at the beginning or during the course of any of steps. Each material may be added in two or more portions at separate steps. For instance, it is allowable to charge polyurethane binder divided into three portions at a kneading step, a dispersing step and a mixing step for viscosity adjustment after dispersion, respectively.

In addition, hitherto known techniques for production may be applied to some steps. At the kneading step, it is advantageous to use mighty kneading machines, such as an open kneader, a continuous kneader, a pressurized kneader and an extruder. When such a kneader is used, a binder (at least 30 weight % of the total binder) in an amount of 15 to 500 parts by weight is kneaded with 100 parts by weight of magnetic or non-magnetic powder. The details of kneading treatment are described in JP-A-1-106338 and JP-A-1-79274.

In order to disperse coating compositions for the magnetic layer and the lower layer, it is possible to use glass beads, but zirconia beads, titania beads and steel beads as dispersion media greater in specific gravity are used preferably. A bead size and a charging rate of the dispersion medium are optimally selected. For the dispersion, known dispersing devices can be used.

As a method of coating a support with coating compositions to form the present magnetic disk having a multilayer structure, the following methods are preferably adopted.

In a first method, a lower layer is formed on a support by the use of a coating machine usually applied in coating magnetic coating compositions, such as a gravure, roll, blade or extrusion coater and, while the lower layer is in a wet condition, an upper layer is coated thereon by the use of a pressurized support type extrusion coating machine as disclosed in JP-B-1-46186, JP-A-60-238179 and JP-A-2-265672.

In a second method, an upper layer and a lower layer are coated almost simultaneously by the use of a coating head having two slits for passage of coating compositions as disclosed in JP-A-63-88080, JP-A-2-17971 and JP-A-2-265672.

In a third method, an upper layer and a lower layer are coated almost simultaneously by the use of a backup roll-attached extrusion coater as disclosed in JP-A-2-174965.

In addition, it is desirable to apply a sheering stress to the coating composition in the interior of a coating head by the use of the method disclosed in JP-A-62-95174 or JP-A-1-236968 for preventing electromagnetic characteristics of the magnetic disk to be formed from degrading due to agglomeration of magnetic particles.

Further, it is preferred that the coating compositions have their viscosities in the numerical range disclosed in JP-A-3-8471.

By adopting a successive multilayer coating method wherein after coating the lower layer and drying it, the magnetic layer is coated thereon, the layer structure of the magnetic disk according to the invention can be achieved without extinction of the present effects. However, it is preferable to adopt the aforementioned simultaneous multilayer coating method from the viewpoints of reduction in coating defects and improvement in dropout quality.

The present magnetic disk can sometimes have sufficiently isotropic orientation without using any orientation apparatus, but it is preferable to make the magnetic disk have isotropic orientation by the use of a random orientation apparatus, e.g., an apparatus equipped with cobalt magnets aligned in a staggered format or an apparatus equipped with a solenoid for application of an alternating magnetic field. As to the isotropic orientation, in-plane two-dimensionally random orientations are generally preferable, but three-dimensionally random orientations with a vertically magnetized component are also appropriate. On the other hand, circumferential orientation may be provided by spin-coating.

In the foregoing coating step, it is appropriate that the drying position on the coating layer be controlled by properly adjusting the temperature and volume of drying air and the coating speed. Specifically, the coating seed is preferably chosen from the range of 20 to 1,000 m/min, and the temperature of drying air is preferable 60° C. or above. In addition, the coating layer may undergo appropriate pre-drying treatment before it enters into the orientation step.

As a roll for calendering, a heat-resistant plastic roll, such as a roll made from epoxy resin, polyimide, polyamide or polyimideamide, or a metal roll can be used. In the case of providing the magnetic layer on both sides, it is preferred that the calendering is performed between two metal rolls. The calender roll temperature is preferably not lower than 50° C., more preferably 100° C. or above, and the linear pressure applied is preferably at least 1960 N/cm, (200 kg/cm), more preferably at least 2940 N/cm (300 kg/cm).

After calendering treatment, the thus produced magnetic recording medium is stamped into disks, and each of these disks is encased in a cartridge provided with a liner on the inside. Further, the intended electromechanical components are attached to the cartridge, thereby producing a magnetic disk. In addition, after stamping the magnetic recording medium into disks, the disks may be subjected to after-treatment, such as thermal treatment at a high temperature (ordinarily from 50 to 90° C.) to promote curing treatment of the coating layers, or burnish treatment with an abrasive tape to scrape protrusions, if desired.

Physical Characteristics

The magnetic layer of the magnetic disk according to the invention has a saturated magnetic flux density of 0.2 to 0.6 tesla (2,000 to 6,000 gauss) under normal conditions. With respect to the coercive force distribution therein, the narrower the better. The values of SFD and SFDr are preferably each 0.6 or below. Further, in an ordinary case, the magnetic layer has a squareness ratio of 0.45 to 0.55 when it is in a randomly oriented state, 0.6 to 0.67 when it is in a state of two-dimensionally random orientation, and at least 0.5 when it is in a vertically oriented state.

The coefficient of friction of the present magnetic disk with a head is preferably at most 0.5, more preferably at most 0.3, at temperatures between −10° C. to 40° C. and humidities between 0% to 95%. The specific resistance at the magnetic layer surface is preferably from $10^4$ to $10^{12}$ Ω/sq, and the electrification potential is preferably within the range of −500 V to +500 V.

It is preferred that the magnetic layer have an elasticity modulus of 980 to 19,600 N/mm² (100 to 2,000 kg/mm²) under a 0.5% elongation in all in-plane directions and a tensile strength of 98 to 686 N/mm² (10 to 70 kg/mm²) at break. On the other hand, it is preferred that the magnetic disk has an elasticity modulus of 980 to 14,700 N/mm² (100 to 1,500 kg/mm²) in all in-plane directions, a residual elongation of at most 0.5% and a thermal shrinkage of at most 1%, more preferably at most 0.5%, still more preferably at most 0.1%, at all of temperatures up to 100° C.

The glass transition temperature of the magnetic layer (the maximum point of loss elasticity modulus in the kinetic viscoelasticity measurement made at 110 Hz) is preferably from 50° C. to 120° C., and that of the lower layer is preferably from 0° C. to 100° C.

The loss elasticity modulus is preferably from $1\times10^3$ to $1\times10^4$ N/cm² ($1\times10^8$ to $8\times10^9$ dyne/cm²), and the loss tangent is preferably at most 0.2. When the loss tangent is too great, a tackiness trouble tends to occur. Preferably, these thermal characteristics and mechanical characteristics are almost uniform in all in-plane directions of the medium with tolerances of 10%. The content of residual solvent in the magnetic layer is preferably 100 mg/m² or below, more preferably 10 mg/m² or below.

It is preferred that the non-magnetic lower layer and the magnetic layer have both a porosity of 30 volume % or below, more preferably 20 volume % or below. The smaller porosity is more favorable for achieving high output, but the porosity maybe increased to an extent necessary for a certain particular purpose. For instance, in the case of repetition use-oriented disk media, it frequently occurs that the greater porosity is more favorable for ensuring running durability.

The Ra of the magnetic layer is within the range described above, and it is preferred that the magnetic layer has a maximum height SRmax of at most 0.5 μm, a ten-point average roughness SRz of at most 0.3 μm, a center-plane peak height SRp of at most 0.3 μm, a center-plane valley depth SRv of at most 0.3 μm, a center-plane area rate SSr of 20 to 80% and an average wavelength Sλa of 5 to 300 μm.

The setting of a projection distribution on the magnetic layer surface can be made as described above, and thereby it becomes possible to obtain the magnetic disk having excellent high-density recording characteristic and high durability, and further markedly improved reliability in the high-density recording region. The methods for adjusting the projection distribution on the magnetic layer surface to the foregoing setting are already mentioned.

In addition, it is preferred to control a curl to within ±3 mm.

In the present magnetic disk, the aforementioned physical characteristics of the lower layer and those of the magnetic layer can be independently adjusted depending on the intended purposes. For instance, high elasticity modulus is conferred on the magnetic layer to improve the running durability, and at the same time the elasticity modulus of the lower layer is rendered lower than that of the magnetic layer to ensure a desirable touch of a head on the magnetic disk.

Now, the invention will be illustrated in more detail by reference to the following examples, but these examples should not be construed as limiting the scope of the invention in any way. All "parts" in the following examples are by weight unless otherwise noted.

<Preparation of Coating Composition>

Magnetic coating composition X:

| | |
|---|---|
| Ferromagnetic metal powder | 100 parts |
| Composition: Fe 70%, Co 30%, | |
| Hc: 183 kA/m (2,300 Oe), | |
| Average major axis length: 0.10 μm, | |
| Crystallite size: 110 A, | |
| σs: 150 A · m² (150 emu/g) | |
| Vinyl chloride copolymer | 10 parts |
| (MR110, a product of Nippon Zeon Co., Ltd.) | |
| Polyurethane resin | 4 parts |
| (UR8200, a product of Toyobo Co., Ltd.) | |
| α-Alumina | 5 parts |
| average particle size: 0.15 μm | |
| Carbon black | 2 parts |
| average particle size: 0.09 μm | |
| Phenylphosphonic acid | 3 parts |
| Butyl stearate | 3 parts |
| Butoxyethyl stearate | 3 parts |
| Isohexadecyl stearate | 3 parts |
| Stearic acid | 1 parts |
| Oleic acid | 1 parts |
| Methyl ethyl ketone | 180 parts |
| Cyclohexanone | 110 parts |

Non-magnetic coating composition P:

| | |
|---|---|
| Titanium oxide as non-magnetic powder | 100 parts |
| Average grain size: 0.035 μm | |
| Specific surface area by BET method: 40 m²/g, | |
| ph: 7, | |
| (Al₂O₃ was present on the grain surface in a proportion of 8 weight % to the whole grains) | |
| Carbon black | 25 parts |
| Average particle size: 0.03 μm | |
| Vinyl chloride copolymer | 16 parts |
| (MR110, a product of Nippon Zeon Co., Ltd.) | |
| Polyurethane resin | 7 parts |
| (UR8200, a product of Toyobo Co., Ltd.) | |
| Phenylphosphonic acid | 4 parts |
| Butyl stearate | 3 parts |
| Butoxyethyl stearate | 3 parts |
| Isohexadecyl stearate | 3 parts |
| Stearic acid | 1 parts |
| Oleic acid | 1 parts |
| Methyl ethyl ketone | 110 parts |
| Cyclohexanone | 190 parts |

Magnetic Coating Composition Y

Magnetic coating composition Y was prepared in the same manner as Magnetic coating composition X, except that the mixing proportion of α-alumina was changed to 20 parts.

Magnetic Coating Composition Z

Magnetic coating composition Z was prepared in the same manner as Magnetic coating composition Y, except that the carbon black used in Magnetic coating composition Y was replaced by carbon black having a particle size of 0.02 μm and the mixing proportion of carbon black was changed to 6 parts.

Non-Magnetic Coating Composition Q

Non-magnetic coating composition Q was prepared in the same manner as Non-magnetic coating composition P, except that the non-magnetic powder was replaced by α-Fe₂O₃ hematite (average major axis length: 0.10 μm, specific surface area determined by BET method: 60 m²/g, pH: 9, acicular ratio: 6) having on the surface an Al₂O₃ coating the proportion of which was 8 weight % to the whole hematite grains.

Non-Magnetic Coating Composition R

Non-magnetic coating composition R was prepared in the same manner as the non--magnetic coating Composition Q, except that the carbon black used in Non-magnetic coating composition Q was replaced by carbon black having a particle size of 0.02 μm and the mixing proportion of carbon black was changed to 32 parts.

Support A

A 62 μm-thick polyethylene terephthalate film, having SRa of 3.6 nm, determined by an optical profiler (light interference type surface roughness profilometer), and containing SiO$_2$ having a particle size of 0.02 μm as filler was referred to as Support A.

Support B

A 62 μm-thick polyethylene terephthalate film having SRa of 32 nm, determined by an optical profiler (light interference type surface roughness profilometer), and containing SiO$_2$ filler having a particle size of 0.02 μm in an amount equal to half the filler content in Support A was referred to as Support B.

Support C

A 62 μm-thick polyethylene terephthalate film having SRa of 3.4 nm, determined by an optical profiler (light interference type surface roughness profilometer), and containing not only SiO$_2$ filler having a particle size of 0.02 μm in an amount equal to half the filler content in Support A but also SiO$_2$ filler having a particle size of 0.2 μm in an amount equal to one tenth the amount of SiO$_2$ filler having a particle size of 0.02 μm was referred to as Support C.

The ingredients to constitute each of the aforementioned coating compositions were kneaded with a kneader, and then dispersed with a sand mill. To each of the dispersions thus prepared, polyisocyanate was added in an amount of 6 parts to the dispersion for forming a non-magnetic layer, or in an amount of 5 parts to the dispersion for forming a magnetic layer. Further, 40 parts of cyclohexanone was added to each of the coating compositions. The resulting compositions were each passed through a filter having an average pore size of 1 μm, thereby preparing coating compositions for magnetic layers and lower layer respectively.

By the use of a simultaneous coating technique, each non-magnetic layer coating composition and each magnetic layer coating composition were applied to each support so that a non-magnetic layer having a dry thickness of 1.5 μm was formed on the support and a magnetic layer having a dry thickness of 0.15 μm was formed on the non-magnetic layer. While both of the layers were in a wet condition, they were treated so as to have random orientation by passing them through an apparatus generating an alternate magnetic field having an intensity of 0.025 tesla (250 gauss) and a frequency of 50 Hz. Further, the other side of each support was also subjected to the same coating and orientation treatments as mentioned above. After drying, the support coated with those layers was subjected to treatment using a 7-stage calender under conditions that the temperature was 90° C. and the linear pressure was 2940 N/cm (300 Kg/cm), and then stamped into disks measuring 3.5 inches in diameter, followed by surface polishing treatment. Then, each of these disks was encased in a 3.5-inch cartridge in which a liner was previously installed (HiFD cartridge), and to the cartridge were attached the intended electromechanical components. Thus, 3.5-inch floppy disks were produced.

Performances of each magnetic disk thus made were evaluated by the following measuring methods.

Measuring Methods (1) Durability: Signals were recorded on each disk, and the resulting disk was made to move with a HiFD drive under a thermocycle setting in which the following flow was taken as one cycle. The durability was evaluated by the time that elapsed before an uncorrectable error occurred in the disk moving under the thermocycle setting.

(Thermocycle Flow

One hour at 25° C. and 50%RH→2 hours for temperature rise to 60° C.→7 hours at 60° C. and 20%RH→2 hours for temperature fall to 25° C.→one hour at 25° C. and 50%RH→2 hours for temperature fall to 5° C.→7 hours at 5° C. and 10%RH→2 hours for temperature rise to 25° C.→<the cycle of this flow was repeated>

(2) Number of projections: As to projections standing at least 20 nm high and those standing at least 70 nm high, the number of projections present on a spot having an area of 30 μm×30 μm was counted by means of an atomic force microscope (AFM) Nanoscope III, made by Digital Isinstrumental Co. Such a measurement was made on 20 spots picked at random, and the average of the counted numbers was taken.

As to projections standing at least 100 nm high, a space having an area of 500 mm$^2$ was observed under an optical microscope, and projections thereon were marked. The heights of these marked projections were measured with an optical profiler (light interference type surface roughness profilometer) TOPO-3D, made by WYKO Co., and thereby the number of projections standing at least 100 nm high was determined.

The measurement results thus obtained are shown in Table 1.

TABLE 1

| Example | Support | Non-magnetic coating composition | Magnetic coating composition | Number of Projections per mm$^2$ | | | Durability (hr) |
|---|---|---|---|---|---|---|---|
| | | | | 20 nm of higher | 70 nm or higher | 100 nm or higher | |
| 1 | A | P | X | 12600 | 555 | 0.004 | 528 |
| 2 | A | Q | X | 56700 | 777 | 0.006 | 480 |
| 3 | A | Q | Z | 87000 | 777 | 0.002 | 612 |

TABLE 1-continued

| Example | Support | Non-magnetic coating composition | Magnetic coating composition | Number of Projections per mm² 20 nm of higher | Number of Projections per mm² 70 nm or higher | Number of Projections per mm² 100 nm or higher | Durability (hr) |
|---|---|---|---|---|---|---|---|
| 4 | A | R | Z | 125200 | 999 | 0 | 1060 |
| 5 | B | R | Z | 49700 | 111 | 0 | 820 |
| 6 | A | Q | Y | 72000 | 888 | 0.004 | 550 |
| Comparative 1 | B | P | X | 5200 | 333 | 0.004 | 184 |
| Comparative 2 | C | P | X | 8800 | 3333 | 0.04 | 88 |
| Comparative 3 | C | R | Z | 51200 | 2222 | 0.02 | 140 |

The results shown in Table 1 indicate the following.

Each of the magnetic disks produced in Examples 1 to 5, whose magnetic layer surface had per mm² at least $1 \times 10^4$ projections standing at least 20 nm high and at most $1 \times 10^3$ per projections standing at least 70 nm high when measured by AFM, offered great durability under the moving condition. In particular, each of the magnetic disks produced in Examples 4 and 5, on the surface of which projections standing at least 100 nm high were not observed when measured by 3D-MIRAU method, had significantly greater durability under the moving condition.

On the other hand, the magnetic disk produced in comparative Example 1 having less than $1 \times 10^4$ projections standing at least 20 nm high per mm² and the magnetic disk produced in Comparative Example 3 having more than $1 \times 10^3$ projections standing at least 70 nm high per mm² were inferior in durability under the moving condition. The magnetic disk produced in Comparative Example 2 having less than $1 \times 10^4$ projections standing at least 20 nm high per mm² and more than $1 \times 10^3$ projections standing at least 70 nm high per mm² was vastly inferior in durability under the moving condition.

The magnetic disks according to the invention are almost free of data loss resulting from magnetic layer destruction caused by head movement.

What is claimed is:

1. A magnetic desk comprising:
   a support;
   a substantially non-magnetic lower layer; and
   a magnetic layer containing a ferromagnetic powder dispersed in a binder, in this order,
   wherein the magnetic layer has a thickness of 0.02 to 0.5 μm and projections on the surface thereof, the number of the projections standing at least 20 nm high measured by an atomic force microscope is at least $1 \times 10^4$ per mm² and the number of the projections standing at least 70 nm high measured by an atomic force microscope is at most $1 \times 10^3$ per mm².

2. The magnetic disk as claimed in claim 1, wherein the number of the projections standing at least 20 nm high on the magnetic layer surface measured by an atomic force microscope is at least $1 \times 10^4$ per mm² and the number of the projections standing at least 70 nm high on the magnetic layer surface measured by an atomic force microscope is at most $2 \times 10^2$ per mm².

3. The magnetic disk as claimed in claim 1, wherein the number of the projections standing at least 100 nm high on the magnetic layer surface measured by an optical profiler is at most 0.01 per mm².

4. The magnetic disk as claimed in claim 1, wherein the lower layer has a thickness of 0.2 to 5 μm.

5. The magnetic disk as claimed in claim 1, wherein the support has a thickness of 10 to 100 μm.

6. The magnetic disk as claimed in claim 1, wherein the support has a center-plane average surface roughness (Ra) of at most 8.0 nm.

7. The magnetic disk as claimed in claim 1, wherein the support has no coarse projections standing at least 0.3 μm high.

8. The magnetic disk as claimed in claim 1, wherein the lower layer contains a non-magnetic powder having an average particle size of 0.005 to 2 μm.

9. The magnetic disk as claimed in claim 1, wherein the ferromagnetic metal powder has a crystallite size of 80 to 180 angstroms.

10. The magnetic disk as claimed in claim 1, wherein the ferromagnetic metal powder has an average major axis length of 30 to 150 nm.

11. The magnetic disk as claimed in claim 1, wherein the ferromagnetic powder has an acicular ratio of 3 to 15.

12. The magnetic disk as claimed in claim 1, wherein the magnetic layer contains at least one of diamond and alumina particles.

13. The magnetic disk as claimed in claim 12, wherein the diamond particles have an average size of 0.05 to 1 μm.

14. The magnetic disk as claimed in claim 12, wherein the alumina particles have an average size of 0.01 to 1 μm.

* * * * *